United States Patent
Shibata et al.

(10) Patent No.: US 8,632,228 B2
(45) Date of Patent: Jan. 21, 2014

(54) VEHICLE HEADLAMP

(75) Inventors: Hiroki Shibata, Shizuoka (JP); Masashi Tatsukawa, Shizuoka (JP); Hiroshi Otaka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 176 days.

(21) Appl. No.: 13/358,671

(22) Filed: Jan. 26, 2012

(65) Prior Publication Data
US 2012/0201039 A1 Aug. 9, 2012

(30) Foreign Application Priority Data

Feb. 3, 2011 (JP) .................................. 2011-021630

(51) Int. Cl.
*G01B 5/00* (2006.01)
(52) U.S. Cl.
USPC ............................ 362/460; 362/545; 362/547
(58) Field of Classification Search
USPC ......... 362/460, 545, 547, 538, 539, 509, 512, 362/264
See application file for complete search history.

(56) References Cited

U.S. PATENT DOCUMENTS

| 5,908,239 | A | * | 6/1999 | Sugimoto | ..................... 362/528 |
| 6,152,584 | A | | 11/2000 | Tsukamoto | |
| 2007/0247865 | A1 | * | 10/2007 | Kinoshita et al. | ............. 362/538 |
| 2008/0247182 | A1 | | 10/2008 | Yasuda et al. | |
| 2012/0257400 | A1 | * | 10/2012 | Shibata | ........................ 362/460 |

FOREIGN PATENT DOCUMENTS

| DE | 102004017454 A1 | 1/2005 |
| DE | 102008013017 A1 | 3/2009 |
| EP | 1234716 A2 | 8/2002 |
| EP | 1946966 A2 | 7/2008 |
| JP | 2008-257959 A | 10/2008 |

OTHER PUBLICATIONS

European Search Report dated May 10, 2012 issued by the European Patent Office in counterpart European Patent Application No. 12151867.4.

* cited by examiner

*Primary Examiner* — Anne Hines
(74) *Attorney, Agent, or Firm* — Sughrue Mion, PLLC

(57) ABSTRACT

A vehicle headlamp includes: a lamp outer casing; a lamp unit; a stationary frame; a movable frame that is supported by the stationary frame to be rotatable about a first rotating shaft extending in a lateral direction or a second rotating shaft extending in a vertical direction; a lens unit disposed in the lamp outer casing and supported by the movable frame; a first aiming operation shaft that adjusts an optical axis, and a second aiming operation shaft that adjusts the optical axis. A focal point of the light reflected by a reflector is coincident with a center of the first or second rotating shaft. The lens unit is rotated about the first or second rotating shaft such that a distance between the focal point and the projection lens is constant. The heat sink is positioned on the outside of the lamp outer casing.

5 Claims, 6 Drawing Sheets

VEHICLE HEADLAMP

CROSS-REFERENCE TO RELATED APPLICATION

This application claims priority from Japanese Patent Application No. 2011-021630, filed on Feb. 3, 2011, the entire contents of which are hereby incorporated by reference.

BACKGROUND

1. Technical Field

The present disclosure relates to a vehicle headlamp. More particularly, the present disclosure relates to a technical field that secures a sealing property in a lamp outer casing and improves a heat-radiation property by fixing a light source unit to a lamp housing while heat sinks are positioned on the outside of a lamp outer casing.

2. Related Art

As a vehicle headlamp, there is, for example, a vehicle headlamp where a lamp unit is disposed in a lamp outer casing including a lamp housing and a cover. The lamp unit includes a lens unit that includes a projection lens projecting light emitted from a light source to the front side and a lens holder holding the projection lens.

As this vehicle headlamp, there is a vehicle headlamp that includes heat sinks for radiating heat generated during the drive of a light source, that is, the emission of light from a light source (see e.g., JP-A-2008-257959).

Further, a vehicle headlamp is provided with an aiming adjustment mechanism that adjusts the direction of an optical axis at the time of the shipment of the vehicle, the inspection of the vehicle, and the like. Accordingly, when an aiming operation shaft of the aiming adjustment mechanism is rotated about an axis, a lamp unit is rotated in a vertical or lateral direction, and thus the direction of an optical axis is adjusted.

In the vehicle headlamp disclosed in JP-A-2008-257959, a lens unit and heat sinks are mounted on a frame disposed in a lamp outer casing and the heat sinks protrude rearward from a protrusion hole formed at a lamp housing. An aiming operation shaft is engaged with the frame. Accordingly, the frame, the lens unit, and the heat sinks are tilted integrally with each other by the rotation of the aiming operation shaft, so that the direction of an optical axis is adjusted.

In the vehicle headlamp, heat generated during the drive of a light source is radiated to the outside through the heat sinks protruding rearward from the lamp housing. Accordingly, a good heat-radiation property is secured. Since the heat generated during the drive of the light source is radiated to the outside, the rise of the temperature of the light source is suppressed and the normal drive state of the light source is secured.

Meanwhile, in the vehicle headlamp disclosed in JP-A-2008-257959, the heat sinks are tilted together with the lens unit when aiming adjustment is performed. For this reason, there is a concern that a gap is formed between the lamp housing and the heat sink.

If a gap is formed between the lamp housing and the heat sinks, a sealing property in the lamp outer casing deteriorates. For this reason, there is a possibility that the amount of light irradiated forward is reduced or the smooth operation of each part is hindered by the penetration of dust or moisture into the lamp outer casing.

SUMMARY OF THE INVENTION

Exemplary embodiments of the present invention may address the above disadvantages and other disadvantages not described above. However, the present invention is not required to overcome the disadvantages described above, and thus, an exemplary embodiment of the present invention may not overcome any disadvantages.

One of illustrative aspects of the present invention is to secure a sealing property in a lamp outer casing, and to improve a heat-radiation property.

According to one or more illustrative aspects of the present invention, there is provided a vehicle headlamp. The vehicle headlamp comprises: a lamp outer casing; a lamp unit disposed in the lamp uter casing and comprising: a light source unit comprising: a light source that emits light; a light source mounting portion on which the light source is disposed; a reflector that reflects the light emitted from the light source, and a heat sink that radiates heat generated from the light source, a stationary frame that is fixed in the lamp outer casing; a movable frame that is supported by the stationary frame so as to be rotatable about a first rotating shaft extending in a lateral direction or a second rotating shaft extending in a vertical direction, a lens unit that is disposed in the lamp outer casing and supported by the movable frame so as to be movable in the lateral or vertical direction, the lens unit comprising: a projection lens that projects the light emitted from the light source; and a lens holder that holds the projection lens, a first aiming operation shaft that moves the lens unit relative to the movable frame in the lateral or vertical direction so as to adjust an optical axis of the vehicle headlamp, and a second aiming operation shaft that rotates the movable frame and the lens unit relative to the stationary frame about the first or second rotating shaft so as to adjust the optical axis. A focal point of the light reflected by the reflector is coincident with a center of the first or second rotating shaft. The lens unit is rotated about the first or second rotating shaft such that a distance between the focal point and the projection lens is constant, and the light source unit is fixed to the lamp housing such that the heat sink is positioned on the outside of the lamp outer casing.

According to one or more illustrative aspects of the present invention, the lamp unit further comprises: a leveling actuator configured to adjust the optical axis and comprising: a main body part mounted on the stationary frame; and a driving part configured to move relative to the main body part in the longitudinal direction. The first or second aiming operation shaft is engaged with the main body part or the driving part, and the first or second aiming operation shaft moves relative to the main body part or the driving part in the longitudinal direction by rotating about an axis.

Accordingly, since the first or second aiming operation shaft used to perform aiming adjustment is also used as the drive shaft used to perform leveling adjustment, it is possible to reduce the size of the vehicle headlamp through the reduction of the number of components.

According to one or more illustrative aspects of the present invention, the light source unit further comprises a driving circuit that drives the light source.

According to one or more illustrative aspects of the present invention, the lamp unit further comprises: a connecting member connected to one of the first and second aiming operation shafts, and moving the lens unit relative to the movable frame in the lateral or vertical direction by rotating about an axis, when the first or second aiming operation shaft rotates about an axis. The connecting member has an insertion hole at one side thereof. The first or second aiming operation shaft is connected to the connecting member. One end portion of the first or second aiming operation shaft is inserted into the insertion hole. A diameter of the insertion hole is gradually increased toward the other end of the first or second aiming operation shaft, and the connecting member is rotated integrally with the lens unit relative to the first or second aiming operation shaft when the lens unit is rotated about the rotating shaft as a fulcrum.

Accordingly, since the connecting member is rotated integrally with the lens unit relative to the first or second aiming operation shaft, a load is not applied to the first or second aiming operation shaft during aiming. As a result, it is possible to prevent the deformation or breakage of the first or second aiming operation shaft.

According to one or more illustrative aspects of the present invention, the light source unit further comprises: a connector positioned behind a central portion of the projection lens so as to supply a drive current to the light source. The first or second aiming operation shaft is positioned on the left or right side of a vertical line passing through a center of the projection lens.

Accordingly, when the first or second aiming operation shaft is operated by a tool, the connector does not interfere with the tool and it is possible to secure the ease of operation when the first or second aiming operation shaft is operated by a tool.

Other aspects and advantages of the present invention will be apparent from the following description, the drawings and the claims.

BRIEF DESCRIPTION OF THE DRAWINGS

FIG. 3 is an exploded perspective view showing a lens unit, a movable frame, and the like;

FIG. 4 is a front view showing the lens unit, the movable frame, and the like;

DETAILED DESCRIPTION

A vehicle headlamp according to a preferred embodiment of the invention will be described below with reference to the accompanying drawings.

Vehicle headlamps 1 are disposed and mounted on both left and right end portions of a front end portion of a vehicle body.

Figure 1:
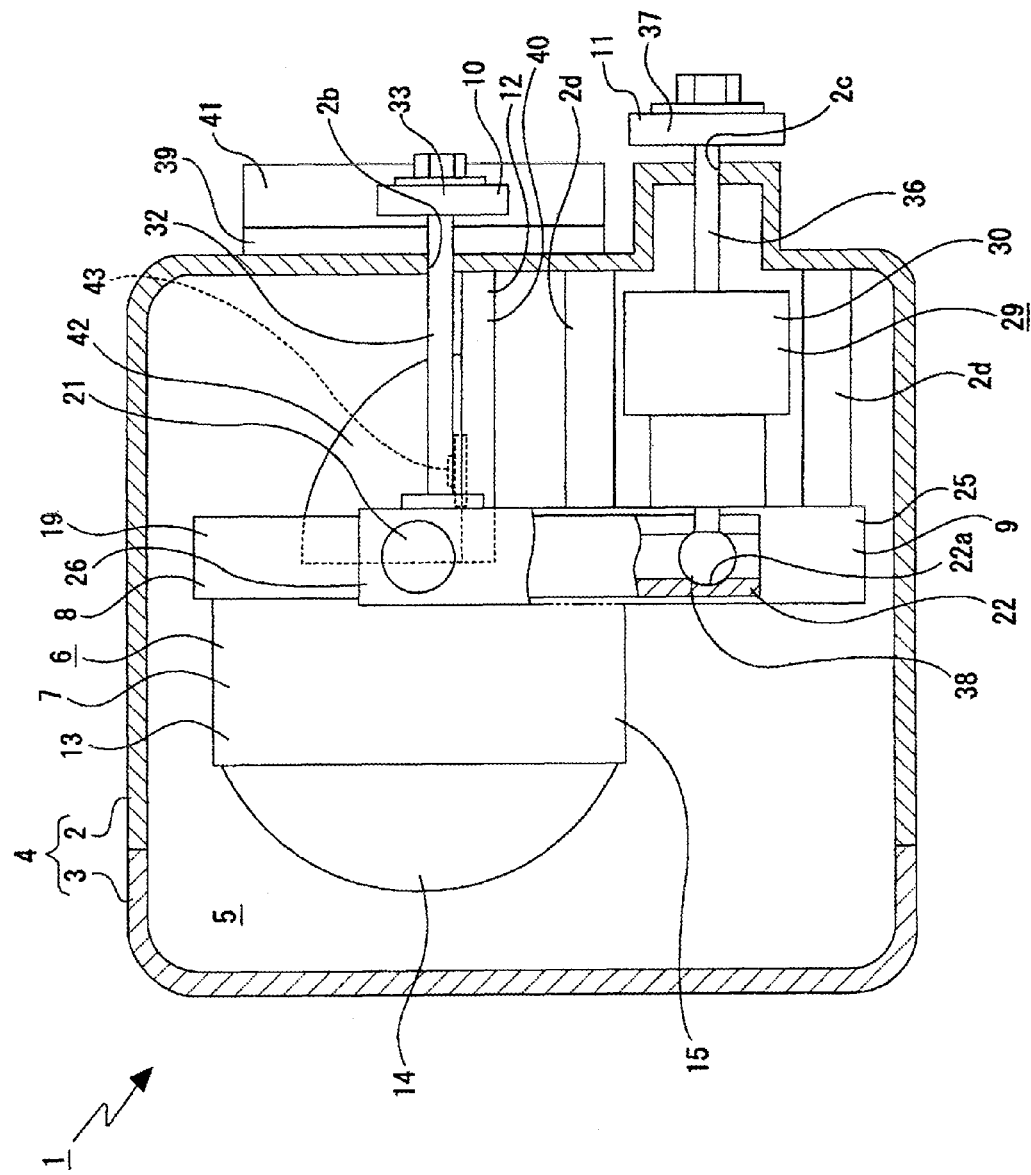
FIG. 1 is a schematic side view of a vehicle headlamp according to an embodiment of the invention, which shows the cross-section of a lamp outer casing.

As shown in FIG. 1, the vehicle headlamp 1 includes a lamp housing 2 and a cover 3. The lamp housing 2 includes a recess that is opened to the front side, and the cover 3 closes an opening of the lamp housing 2. The lamp housing 2 and the cover 3 form a lamp outer casing 4. An inner space of the lamp outer casing 4 is formed as a lamp chamber 5.

Figure 2:
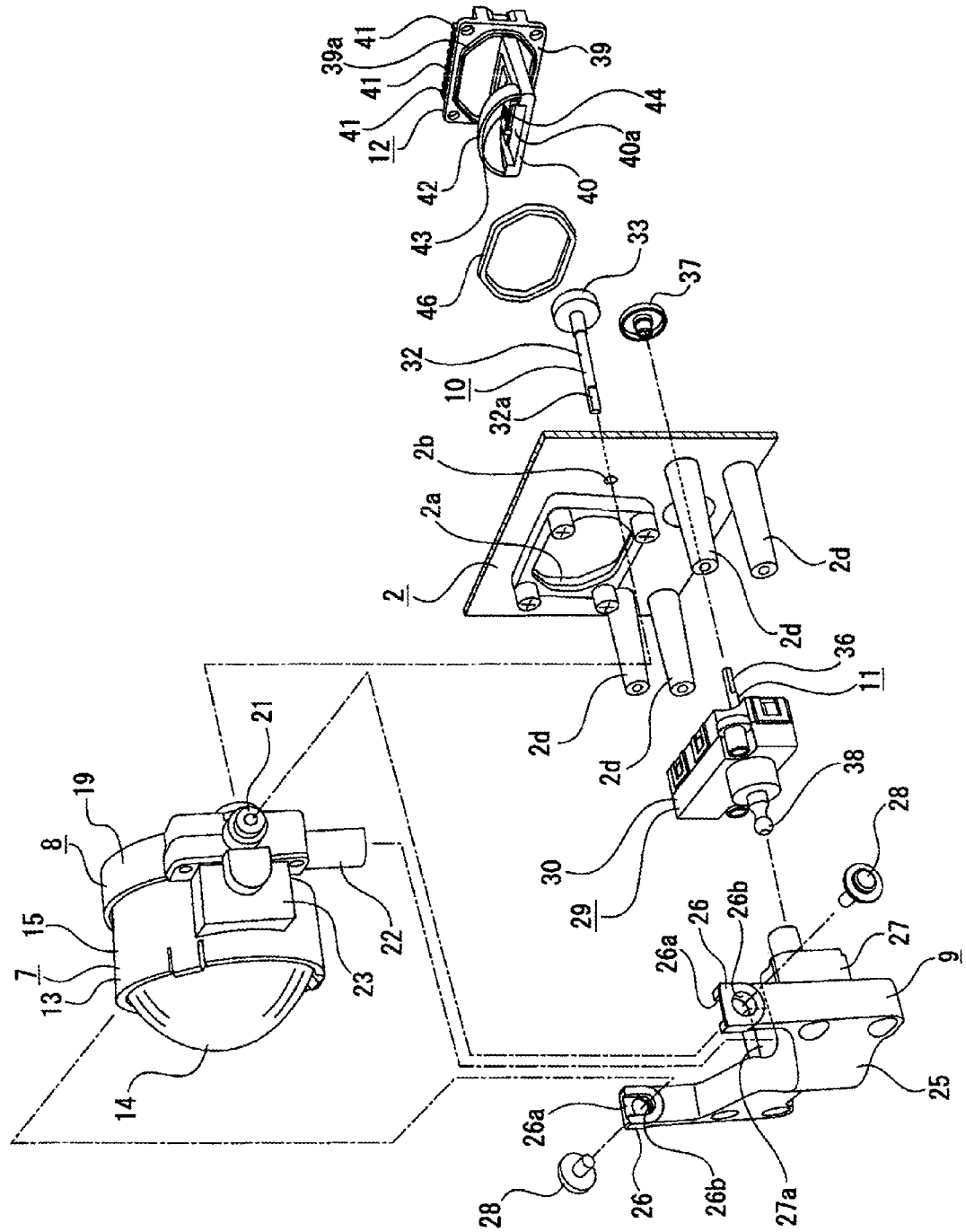
FIG. 2 is an exploded perspective view of the vehicle headlamp of which a part is omitted.

A mounting hole 2a, which passes through the lamp housing in a longitudinal direction of a vehicle, is formed at the rear end portion of the lamp housing 2 (see FIG. 2). Shaft insertion holes 2b and 2c, which pass through the lamp housing in the longitudinal direction, are formed at the rear end portion of the lamp housing 2. The shaft insertion holes 2b and 2c are positioned on the side of the mounting hole 2a so as to be separated from each other in a vertical direction (see FIGS. 1 and 2).

Mounting shaft portions 2d, 2d, . . . , which protrude forward, are formed at the lamp housing 2 so as to be separated from each other in the vertical and lateral directions.

A lamp unit 6 is disposed in the lamp outer casing 4 (see FIGS. 1 and 2).

Figure 3:
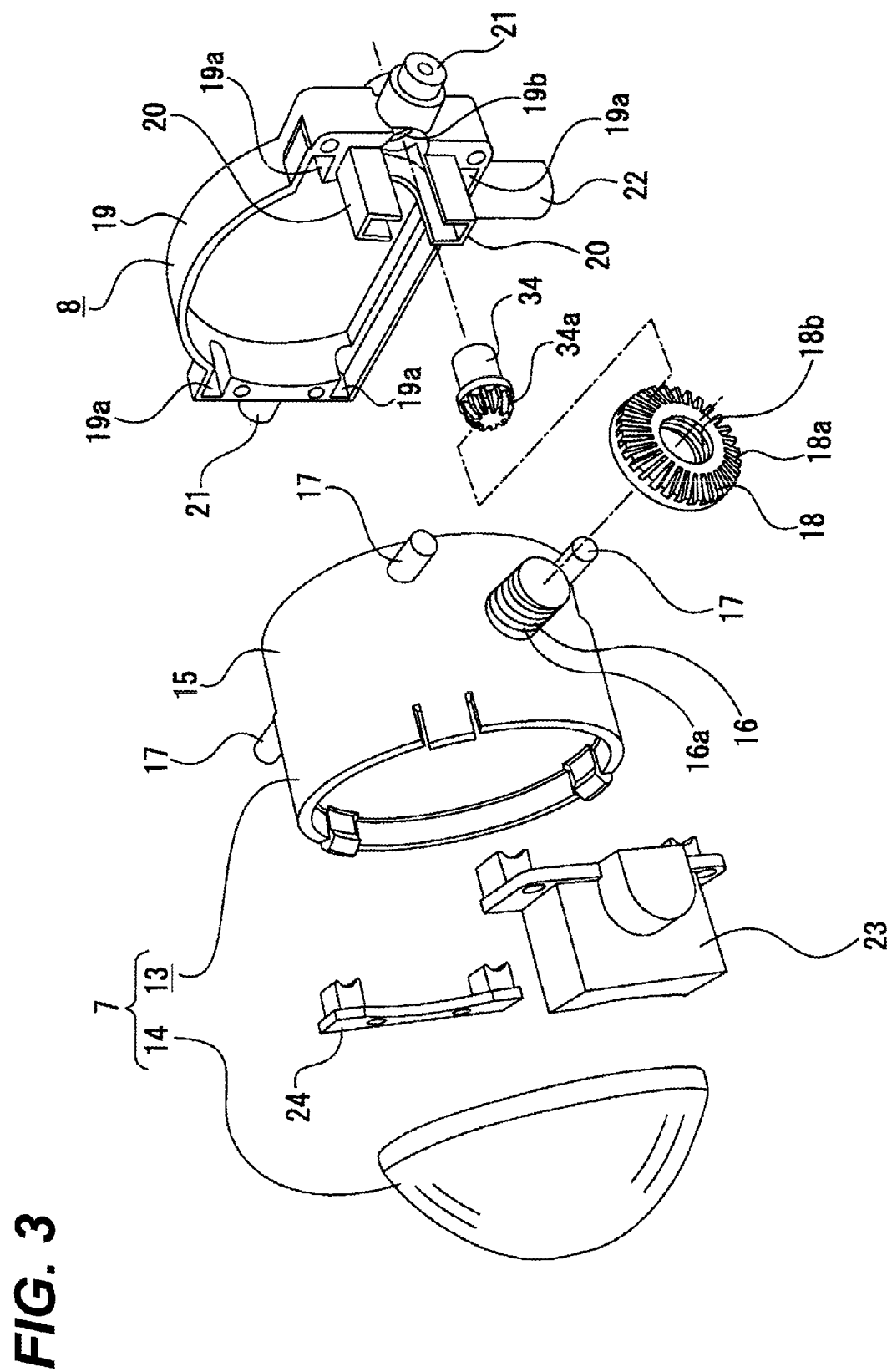

The lamp unit 6 includes a lens unit 7, a movable frame 8, a stationary frame 9, a first aiming operation shaft 10, a second aiming operation shaft 11, and a light source unit 12 (see FIGS. 1 to 3).

The lens unit 7 includes a lens holder 13 and a projection lens 14 that is mounted on the front end portion of the lens holder 13. The lens holder 13 includes a holder portion 15 that is formed in a substantially cylindrical shape, a screw shaft 16 that protrudes laterally from the holder portion 15, and supported shafts 17, 17, . . . that protrude from the holder portion 15 toward the left and right sides. A spiral groove 16a is formed on the outer peripheral surface of the screw shaft 16. The supported shafts 17, 17, . . . are formed at the holder portion so as to be separated from each other in the vertical and lateral directions.

A gear 18 is threadedly engaged with the screw shaft 16 of the lens holder 13. The gear 18 is a bevel gear, is formed in a substantially annular shape, has a gear portion 18a on one side surface thereof, and has a spiral groove portion 18b on the inner peripheral surface thereof. The spiral groove portion 18b of the gear 18 is threadedly engaged with the spiral groove 16a of the screw shaft 16.

When the gear 18 is rotated, the spiral groove 16a of the screw shaft 16 is moved, so that the lens unit 7 is moved in the lateral direction according to the rotating direction of the gear 18.

The movable frame 8 includes a supporting frame portion 19 that is formed in the shape of a horizontally long frame, gear supporting protrusions 20 and 20 that protrude forward from the left end portion of the supporting frame portion 19, rotating shafts 21 and 21 that protrude from the supporting frame portion 19 toward the left and right sides, respectively, and a connecting protrusion 22 that protrudes downward from the supporting frame portion 19.

Shaft supporting recesses 19a, 19a, . . . , which are opened to the front side and inside so as to be separated from each other in the vertical and lateral directions, are formed at the supporting frame portion 19. A member insertion hole 19b, which passes through the supporting frame portion in the longitudinal direction, is formed at the left end portion of the supporting frame portion 19.

The gear supporting protrusions 20 and 20 are formed so as to be separated from each other in the vertical direction, and are positioned above and below the member insertion hole 19b.

A connecting recess 22a, which is opened to the rear side, is formed at the connecting protrusion 22.

The lens unit 7 is supported by the movable frame 8 so as to be movable in the lateral direction. The supported shafts 17, 17, . . . are inserted into the shaft supporting recesses 19a, 19a, . . . from the front side, respectively, and the lens unit 7 is supported by the movable frame 8 so that the supported shafts 17, 17, . . . are slidable in the shaft supporting recesses 19a, 19a, . . . , respectively (see FIG. 4). When the lens unit 7 is supported by the movable frame 8, the gear 18 is inserted into the gear supporting protrusions 20 and 20 from the front side. Accordingly, the gear 18 is rotatably supported by the gear supporting protrusions 20 and 20 so as not to be movable in the lateral direction.

When the lens unit 7 is supported by the movable frame 8, first and second pressing members 23 and 24 are mounted on the left and right end portions of the supporting frame portion 19 of the movable frame 8 from the front side, respectively (see FIG. 3). The first pressing member 23 is mounted on the left end portion of the supporting frame portion 19, so that the gear 18 is closed and the separation of the supported shafts 17 and 17, which are positioned on the left portion of the holder portion, from the shaft supporting recesses 19a and 19a is prevented. The second pressing member 24 is mounted on the right end portion of the supporting frame portion 19, so that the separation of the supported shafts 17 and 17, which are positioned on the right portion of the holder portion, from the shaft supporting recesses 19a and 19a is prevented.

As shown in FIGS. 1 and 2, the stationary frame 9 includes a base portion 25, shaft supporting protrusions 26 and 26 that protrude upward from both the left and right end portions of the base portion 25, respectively, and a mounting protrusion 27 that protrudes rearward from the lower end portion of the base 25. Shaft supporting recesses 26a and 26a, which are respectively opened to the upper side and inside, and insertion holes 26b and 26b, which respectively pass through the upper end portions of the shaft supporting protrusions in the lateral direction, are formed at the upper end portions of the shaft supporting protrusions 26 and 26. An arrangement space 27a, which is opened to the rear side, is formed at the mounting protrusion 27.

The base portion 25 is connected to the mounting shaft portions 2d, 2d, . . . by, for example, screws or the like, so that the stationary frame 9 is fixed to the lamp housing 2.

The movable frame 8 is rotatably supported by the stationary frame 9. The rotating shafts 21 and 21 are inserted into the shaft supporting recesses 26a and 26a of the shaft supporting protrusions 26 and 26 from the upper side, respectively, and fasteners 28 and 28, which are inserted into the insertion holes 26b and 26b, respectively, are connected to the rotating shafts, so that the movable frame 8 is supported by the stationary frame 9. When the movable frame 8 is supported by the stationary frame 9, the movable frame 8 can be rotated in a vertical direction relative to the stationary frame 9 about the rotating shafts 21 and 21 as a fulcrum. The connecting protrusion 22 of the movable frame 8 is positioned in the arrangement space 27a of the stationary frame 9.

A leveling actuator 29 is mounted on the stationary frame 9. The leveling actuator 29 includes a main body part 30 and a cylindrical driving part 31 that is moved relative to the main body part 30 in the longitudinal direction (see FIGS. 2 and 5). A spiral groove (not shown) is formed on the inner peripheral surface of the driving part 31.

The main body part 30 of the leveling actuator 29 is mounted on the rear surface of the mounting protrusion 27 by, for example, screws or the like, and a part of the leveling actuator 29 is disposed in the arrangement space 27a.

The first aiming operation shaft 10 includes a shaft portion 32 that extends in the longitudinal direction and a rotary operation portion 33 that is connected to the rear end of the shaft portion 32. The front end portion of the shaft portion 32 is formed as a rotation preventing portion 32a that is formed in a non-circular shape.

Figure 6:
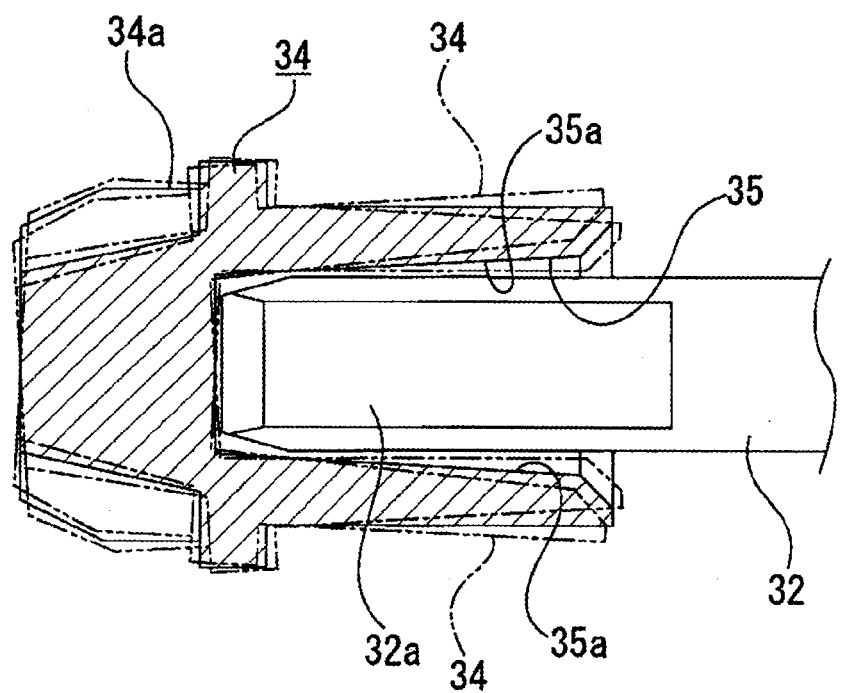
FIG. 6 is an enlarged side view showing the cross-section of a part of a connecting structure of a first aiming operation shaft connected to a connecting member.

The shaft portion 32 of the first aiming operation shaft 10 is inserted into the upper shaft insertion hole 2b formed at the lamp housing 2, and the rotation preventing portion 32a is connected to a connecting member 34 (see FIG. 6).

A gear portion 34a is formed at the front end portion of the connecting member 34. An insertion hole 35, which is opened to the rear side, is formed at the connecting member 34, and both upper and lower wall surfaces of the wall surfaces of the insertion hole 35 are formed as inclined surfaces 35a and 35a that are inclined so as to be separated from each other toward the rear side. Accordingly, the size of the insertion hole 35 is increased toward the rear side, so that gaps are formed between the rotation preventing portion 32a of the shaft portion 32 and the inclined surfaces 35a and 35a.

When the rotation preventing portion 32a of the first aiming operation shaft 10 is inserted into and connected to the insertion hole 35 of the connecting member 34, the rotation preventing portion 32a is fitted into the insertion hole 35 in the lateral direction. Accordingly, when the first aiming operation shaft 10 is rotated about an axis by the operation of the rotary operation portion 33, the connecting member 34 is rotated integrally with the first aiming operation shaft 10.

Figure 4:
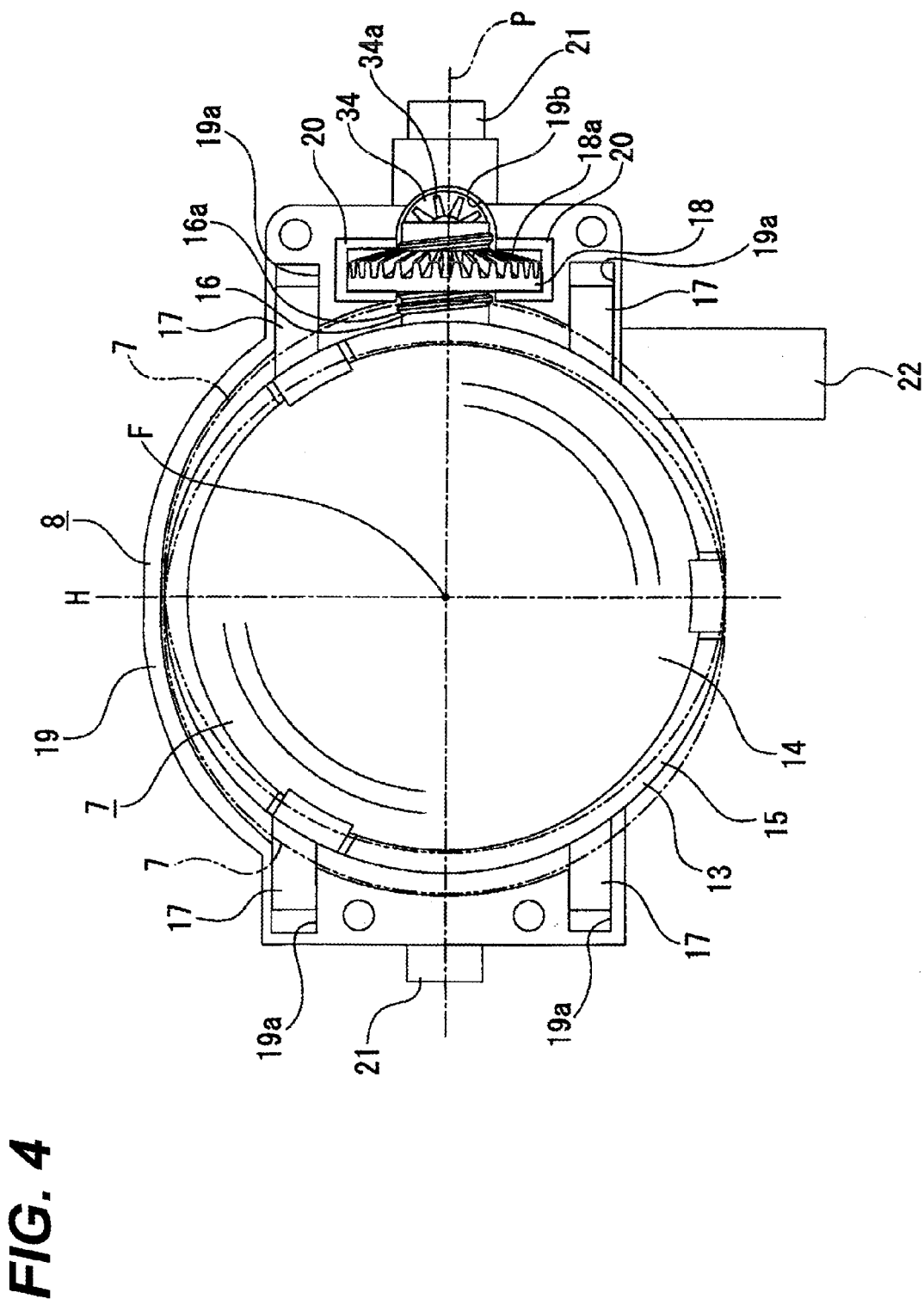

The connecting member 34 is inserted into the member insertion hole 19b of the movable frame 8 from the front side and meshes with the gear 18 of which the gear portion 34a is threadedly engaged with the screw shaft 16 of the lens unit 7 (see FIGS. 3 and 4). Accordingly, when the connecting member 34 is rotated by the rotation of the first aiming operation shaft 10, the gear 18 is rotated in the direction corresponding to the rotating direction of the first aiming operation shaft 10, the spiral groove 16a of the screw shaft 16 is moved, and the supported shafts 17, 17, . . . are guided by the shaft supporting recesses 19a, 19a, . . . , respectively, and the lens unit 7 is moved in the lateral direction (the moving lens unit 7 is shown in FIG. 4 by an imaginary line).

Aiming adjustment in the lateral direction is performed by the lateral movement of the lens unit 7.

As shown in FIG. 2, the second aiming operation shaft 11 includes a shaft portion 36 that extends in the longitudinal direction, a rotary operation portion 37 that is connected to the rear end of the shaft portion 36, and a spherical connecting portion 38 that is connected to the front end of the shaft portion 36. The front end portion of the shaft portion 36 is formed as a spiral groove portion 36a.

Figure 5:
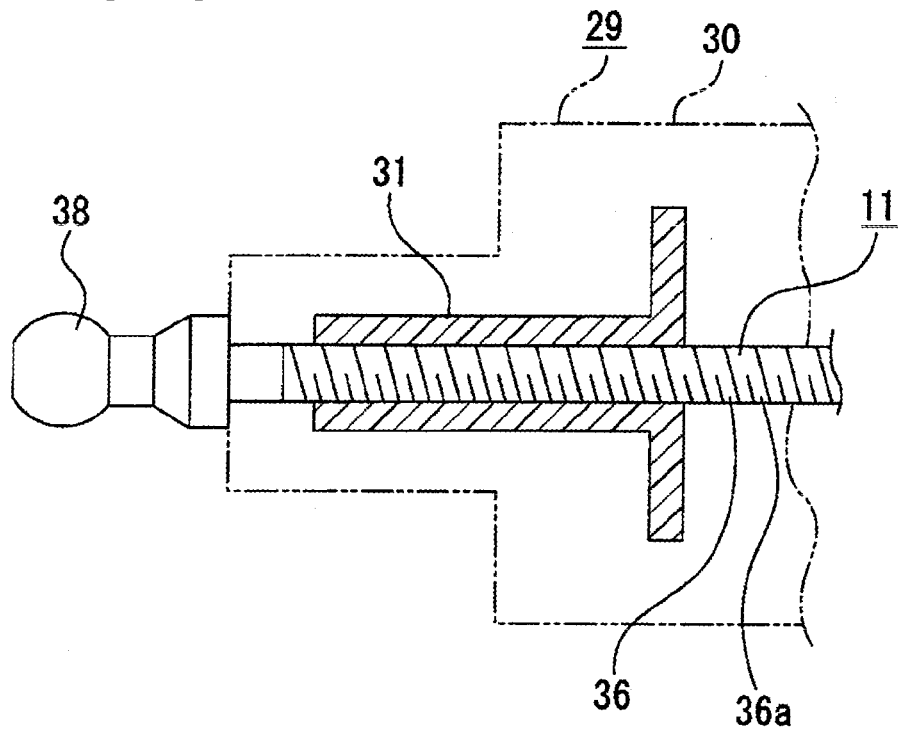
FIG. 5 is an enlarged side view schematically showing the cross-section of a part of a structure of a second aiming operation shaft and a leveling actuator.

The shaft portion 36 of the second aiming operation shaft 11 is inserted into the lower shaft insertion hole 2c formed at the lamp housing 2 and the driving part 31 of the leveling actuator 29 (see FIG. 5). When the shaft portion 36 is inserted into the driving part 31, the spiral groove portion 36a is engaged with the spiral groove formed on the inner peripheral surface of the driving part 31. The spherical connecting portion 38 is inserted into the connecting recess 22a formed at the connecting protrusion 22, so that the second aiming operation shaft 11 is connected to the movable frame 8.

Meanwhile, an example where the shaft portion 36 of the second aiming operation shaft 11 is inserted into and engaged with the driving part 31 of the leveling actuator 29 has been described above. However, for example, the shaft portion 36 of the second aiming operation shaft 11 may be engaged with the main body part 30 of the leveling actuator 29.

When the second aiming operation shaft 11 is rotated about an axis by the operation of the rotary operation portion 37, the spiral groove portion 36a is moved relative to the driving part 31, so that the second aiming operation shaft 11 is moved in the longitudinal direction. When the second aiming operation shaft 11 is moved in the longitudinal direction, the movable frame 8 is rotated integrally with the lens unit 7 in the vertical direction relative to the stationary frame 9 about the rotating shafts 21 and 21 as a fulcrum.

The aiming adjustment in the vertical direction is performed by the rotation of the lens unit 7 in the vertical direction.

Meanwhile, when the driving part 31 is moved relative to the main body part 30 in the longitudinal direction by the driving of the leveling actuator 29, the driving part 31 is moved integrally with the second aiming operation shaft 11 in the longitudinal direction. Accordingly, the movable frame 8 is rotated integrally with the lens unit 7 in the vertical direction relative to the stationary frame 9 about the rotating shafts 21 and 21 as a fulcrum.

Leveling adjustment is performed by the rotation of the lens unit 7 in the vertical direction.

As described above, in the vehicle headlamp 1, the second aiming operation shaft 11 used to perform aiming adjustment is used as a drive shaft used to perform leveling adjustment.

Accordingly, it is possible to reduce the size of the vehicle headlamp through the reduction of the number of components.

Meanwhile, an example where the leveling adjustment mechanism is provided other than the aiming adjustment mechanism has been described above. However, only the aiming adjustment mechanism may be provided without the leveling adjustment mechanism. In this case, for example, a member, which has the same spiral groove as the spiral groove of the driving part 31 of the leveling actuator 29, may be mounted on the mounting protrusion 27 of the stationary frame 9, and the spiral groove portion 36a of the second aiming operation shaft 11 may be threadedly engaged with this member.

Like in a vehicle headlamp that is provided with the aiming adjustment mechanism and the leveling adjustment mechanism as described above, the second aiming operation shaft 11 may be disposed using the stationary frame 9 even in a vehicle headlamp that is provided with only the aiming adjustment mechanism. Accordingly, it is possible to share the components of other types of vehicle headlamps and to reduce manufacturing costs.

As described above, the lens unit 7 is rotated integrally with the movable frame 8 about the rotating shafts 21 and 21 as a fulcrum when aiming adjustment is performed in the vertical direction. In this case, as described above, since the inclined surfaces 35a and 35a are formed at the connecting member 34 and gaps are formed between the rotation preventing portion 32a of the shaft portion 32 and the inclined surfaces 35a and 35a, the connecting member 34 is rotated integrally with the lens unit 7 and the movable frame 8 relative to the first aiming operation shaft 10 (the rotating connecting member 34 is shown in FIG. 6 by an imaginary line).

Accordingly, a load is not applied to the first aiming operation shaft 10 during aiming in the vertical direction, such that it is possible to prevent the deformation or breakage of the first aiming operation shaft 10.

Figure 7:
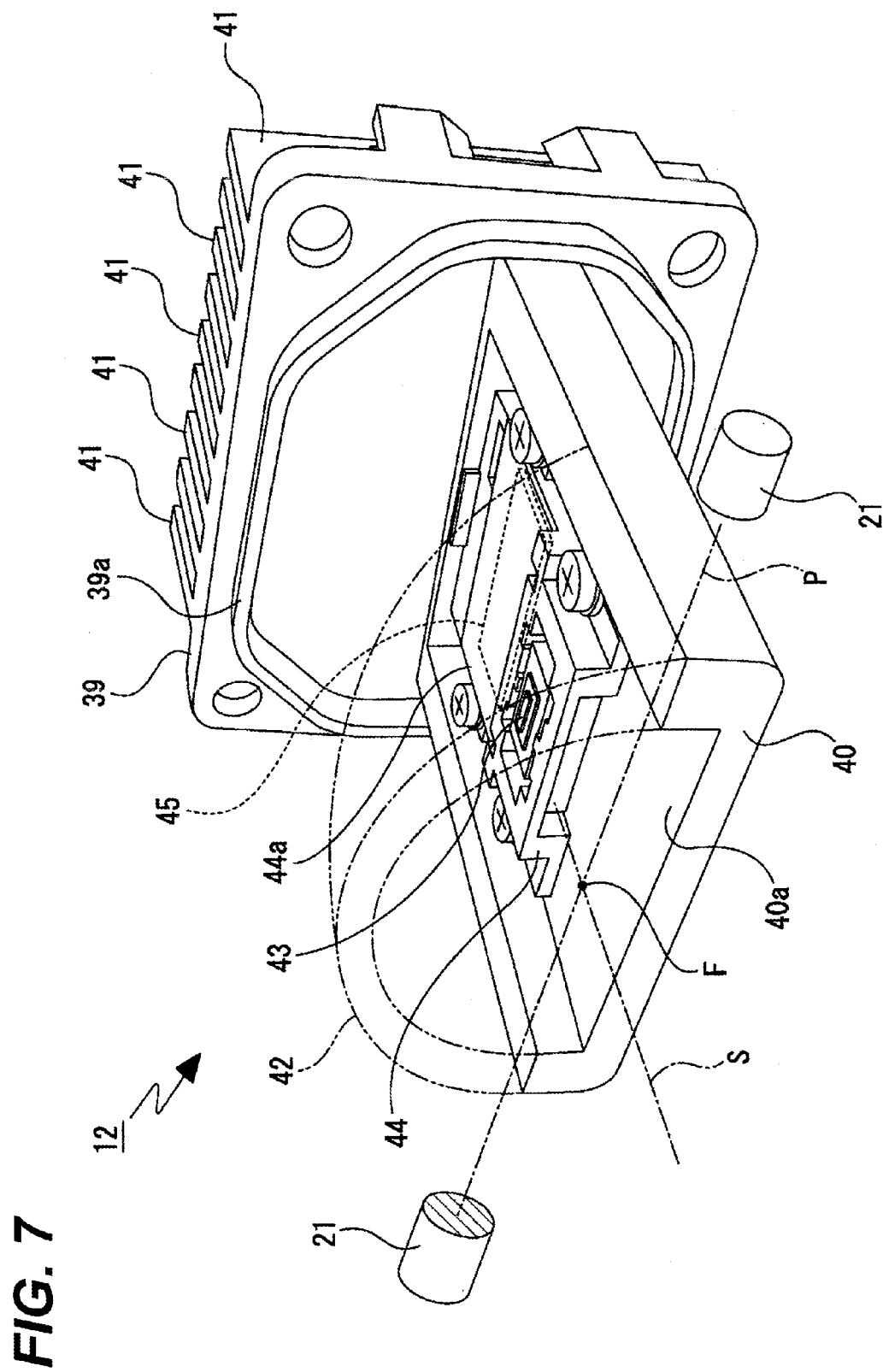
FIG. 7 is an enlarged perspective view of a light source unit.

As shown in FIGS. 2 and 7, the light source unit 12 includes a plate-like fixed portion 39 that faces the longitudinal direction, a plate-like light source mounting portion 40 that protrudes forward from the fixed portion 39 and faces the vertical direction, a plurality of heat sinks 41, 41, . . . that protrudes rearward from the fixed portion 39, a reflector 42 that is mounted on the light source mounting portion 40, and a light source 43 that is disposed on the light source mounting portion 40.

An annular fitting portion 39a, which protrudes forward, is formed at the fixed portion 39. The fitting portion 39a is positioned so as to surround the rear end portion of the light source mounting portion 40.

A mounting recess 40a, which is opened to the upper side and the front side, is formed at the light source mounting portion 40. A holding body 44 is mounted on the mounting recess 40a, and the light source 43 is disposed on the light source mounting portion 40 so as to be held by the holding body 44. For example, a light-emitting diode (LED) is used as the light source 43. The reflector 42 is mounted on the light source mounting portion 40 so as to cover the light source 43 from above.

The holding body 44 includes a lid 44a. A driving circuit 45 for driving the light source 43 is disposed in the holding body 44, and the driving circuit 45 is closed by the lid 44a from above.

As described above, in the vehicle headlamp 1, one light source unit 12 includes the driving circuit 45 and the light source 43 driven by the driving circuit 45. Accordingly, it is possible to reduce the manufacturing costs and the size of the vehicle headlamp.

Meanwhile, the holding body 44 for holding the driving circuit 45 or the light source 43 may be formed integrally with the light source mounting portion 40. In this case, it is possible to further reduce the manufacturing costs of the vehicle headlamp through the reduction of the number of components.

Further, since the light source 43 and the driving circuit 45 are mounted on the light source mounting portion 40, a connecting cord for connecting the light source 43 with the driving circuit 45 is not needed. As a result, it is possible to further reduce the manufacturing costs of the vehicle headlamp through the reduction of the number of components.

The fixed portion 39 of the light source unit 12 is fixed to the rear end portion of the lamp housing 2 from the rear side by, for example, screws or the like so that a packing 46 made of rubber or the like is externally fitted to the fitting portion 39a. When the light source unit 12 is fixed to the lamp housing 2, the light source mounting portion 40 and the reflector 42 are inserted into the mounting hole 2a from the rear side. Accordingly, the light source mounting portion 40, the reflector 42, the light source 43, the holding body 44, and the driving circuit 45 are disposed in the lamp chamber 5. The heat sinks 41, 41, . . . of the light source unit 12 are positioned on the outside (rear side) of the lamp outer casing 4.

When the light source unit 12 is fixed to the lamp housing 2, a focal point F of the light, which is emitted from the light source 43 and reflected by the reflector 42, corresponds to the axis P of the rotating shafts 21 and 21 of the movable frame 8 (see FIGS. 4 and 7). Further, the focal point F is present on an optical axis S, and the optical axis S and the axis P cross each other.

Accordingly, when the leveling adjustment and aiming adjustment in the vertical direction are performed by the rotation of the lens unit 7 in the vertical direction as described above, a distance between the focal point F and the projection lens 14 is constant.

A connector (not shown) connected to a power circuit (not shown) is connected to the rear end portion of the lamp housing 2, so that power is supplied to the driving circuit 45 from the power circuit through the connector.

The connector is positioned in the middle of the lamp housing 2 in the lateral direction, and is positioned above or below the mounting hole 2a. Since the connector is positioned in the middle of the lamp housing 2 in the lateral direction, the same lamp housing 2 and the like may be used for left and right vehicle headlamps 1 and 1. As a result, it is possible to share the components of the left and right vehicle headlamps 1 and 1.

In the vehicle headlamp 1, as described above, the shaft portion 32 of the first aiming operation shaft 10 and the shaft portion 36 of the second aiming operation shaft 11 are inserted into the shaft insertion holes 2b and 2c formed on the side of the mounting hole 2a, respectively. Accordingly, the first and second aiming operation shafts 10 and 11 are positioned on the side (left or right side) of a vertical line H (see FIG. 4) passing through the center of the projection lens 14, and the rotary operation portions 33 and 37 are positioned on the side of the connector that is used to supply power to the driving circuit 45.

The rotary operation portions 33 and 37 may be operated so as to be rotated from the upper or lower side by a tool such as a screwdriver. Accordingly, if the rotary operation portions 33 and 37 are positioned on the side of the connector as described above, the connector does not interfere with a tool such as a screwdriver during the operation of the rotary operation portions 33 and 37.

Therefore, it is possible to secure the ease of operation when operating the rotary operation portions 33 and 37 with a tool such as a screwdriver.

As described above, in the vehicle headlamp 1, the light source unit 12 is fixed to the lamp housing 2 and the heat sinks 41, 41, . . . are positioned on the outside of the lamp outer casing 4.

Accordingly, when aiming adjustment is performed, the heat sinks 41, 41, . . . are not moved together with the lens unit 7 and it is possible to secure a sealing property in the lamp outer casing 4 and to improve a heat-radiation property.

Further, since the heat sinks 41, 41, . . . are not present in the lamp outer casing 4, it is possible to reduce the size of the lamp outer casing 4 to the extent of the size the heat sinks. Furthermore, since a heat-radiation property is high, the heat sinks 41, 41, . . . may be made small. Therefore, it is possible to reduce the size of the vehicle headlamp 1.

In addition, since a heat-radiation property can be improved, other heat-radiating members such as heat-radiating fans are not needed. Accordingly, it is possible to reduce the manufacturing costs of the vehicle headlamp through the reduction of the number of components.

Moreover, since the lens unit 7 and the light source unit 12 are formed separately from each other in the vehicle headlamp 1, it is possible to replace the light source unit 12 alone separately from the lens unit 7 or to detach/attach the light source unit 12 from/to the lamp housing 2 alone. Accordingly, it is possible to improve the maintainability of the vehicle headlamp.

In addition, the lens unit 7 is rotated about the rotating shafts 21 and 21 as a fulcrum during the aiming adjustment in the vertical direction so that the focal point F of the light, which is emitted from the light source 43 and reflected by the reflector 42, corresponds to the axis P of the rotating shafts 21 and 21 and a distance between the focal point F and the projection lens 14 is constant.

Accordingly, a light distribution pattern is not adversely affected by aiming adjustment in the vertical direction.

In the above description, the lens unit 7 has been linearly moved in the lateral direction during the aiming adjustment in the lateral direction and the lens unit 7 has been rotated in the vertical direction during the aiming adjustment in the vertical direction. However, in contrast, the lens unit may be rotated in the lateral direction during the aiming adjustment in the lateral direction and the lens unit may be linearly moved in the vertical direction during the aiming adjustment in the vertical direction.

In this case, a rotating shaft extending in the vertical direction may be provided on the movable frame so that the lens unit is rotated in the lateral direction, and a supported shaft extending in the vertical direction may be provided on the lens unit so that the lens unit is moved in the vertical direction. At this time, the lens unit may be rotated in the lateral direction by the rotating operation of one of the first and second aiming operation shafts, and the lens unit may be moved in the vertical direction by the rotating operation of the other of the first and second aiming operation shafts.

Further, an example where the stationary frame 9 is fixed to the lamp housing 2 has been described above. However, for example, a forward protruding portion may be formed on the light source unit and the stationary frame 9 may be fixed to the protruding portion.

Moreover, an example where a light-emitting diode is used as the light source 43 has been described above. However, the light source 43 is not limited to the light-emitting diode and other kinds of light sources, that is, a discharge lamp such as a ceramic metal halide lamp may be used as the light source 43.

Furthermore, an example where the shaft portion 36 of the second aiming operation shaft 11 is used as the drive shaft of the leveling actuator 27 has been described above. However, for example, the second aiming operation shaft may be connected to the lens unit and may be movable relative to the stationary frame in the longitudinal direction so that aiming adjustment is performed; and the leveling actuator may be movably connected to the second aiming operation shaft and a drive shaft connected to the lens unit may be provided at the leveling actuator so that leveling adjustment is performed through the movement of the entire leveling actuator.

All of the shapes and structures of the respective portions described in the above-mentioned preferred embodiment of the invention are merely illustrative for the embodiment of the invention, and the technical scope of the invention is not limited by these shapes and structures.

While aspects of embodiments of the present invention have been shown and described above, other implementations are within the scope of the claims. It will be understood by those skilled in the art that various changes in form and details may be made therein without departing from the spirit and scope of the invention as defined by the appended claims.

What is claimed is:

1. A vehicle headlamp comprising:
a lamp outer casing;
a lamp unit disposed in the lamp outer casing and comprising:
   a light source unit comprising:
      a light source that emits light;
      a light source mounting portion on which the light source is disposed;
      a reflector that reflects the light emitted from the light source, and
      a heat sink that radiates heat generated from the light source,
   a stationary frame that is fixed in the lamp outer casing;
   a movable frame that is supported by the stationary frame so as to be rotatable about a first rotating shaft extending in a lateral direction or a second rotating shaft extending in a vertical direction,
   a lens unit that is disposed in the lamp outer casing and supported by the movable frame so as to be movable in the lateral or vertical direction, the lens unit comprising:
      a projection lens that projects the light emitted from the light source; and
      a lens holder that holds the projection lens,
   a first aiming operation shaft that moves the lens unit relative to the movable frame in the lateral or vertical direction so as to adjust an optical axis of the vehicle headlamp, and
   a second aiming operation shaft that rotates the movable frame and the lens unit relative to the stationary frame about the first or second rotating shaft so as to adjust the optical axis, wherein
a focal point of the light reflected by the reflector is coincident with a center of the first or second rotating shaft,
the lens unit is rotated about the first or second rotating shaft such that a distance between the focal point and the projection lens is constant, and
the light source unit is fixed to the lamp housing such that the heat sink is positioned on the outside of the lamp outer casing.

2. The vehicle headlamp according to claim 1, wherein the lamp unit further comprises:
a leveling actuator configured to adjust the optical axis and comprising:
a main body part mounted on the stationary frame; and
a driving part configured to move relative to the main body part in the longitudinal direction,
wherein the first or second aiming operation shaft is engaged with the main body part or the driving part, and
the first or second aiming operation shaft moves relative to the main body part or the driving part in the longitudinal direction by rotating about an axis.

3. The vehicle headlamp according to claim 1, wherein the light source unit further comprises a driving circuit that drives the light source.

4. The vehicle headlamp according to claim 1, wherein the lamp unit further comprises:
a connecting member connected to one of the first and second aiming operation shafts, and moving the lens unit relative to the movable frame in the lateral or vertical direction by rotating about an axis, when the first or second aiming operation shaft rotates about an axis, and
wherein the connecting member has an insertion hole at one side thereof,
the first or second aiming operation shaft is connected to the connecting member, and
one end portion of the first or second aiming operation shaft is inserted into the insertion hole,
a diameter of the insertion hole is gradually increased toward the other end of the first or second aiming operation shaft, and
the connecting member is rotated integrally with the lens unit relative to the first or second aiming operation shaft when the lens unit is rotated about the rotating shaft as a fulcrum.

5. The vehicle headlamp according to claim 1, wherein the light source unit further comprises:
a connector positioned behind a central portion of the projection lens so as to supply a drive current to the light source, and
wherein the first or second aiming operation shaft is positioned on the left or right side of a vertical line passing through a center of the projection lens.

* * * * *